United States Patent
Su

(10) Patent No.: US 8,024,543 B2
(45) Date of Patent: Sep. 20, 2011

(54) SYSTEM AND METHOD FOR MANAGING A MEMORY SYSTEM OF A MOBILE DEVICE

(75) Inventor: Yi-Jen Su, Taipei (TW)

(73) Assignee: Chi Mei Communications Systems, Inc., Tu-Cheng, New Taipei (TW)

(*) Notice: Subject to any disclaimer, the term of this patent is extended or adjusted under 35 U.S.C. 154(b) by 291 days.

(21) Appl. No.: 12/479,831

(22) Filed: Jun. 7, 2009

(65) Prior Publication Data

US 2010/0131735 A1 May 27, 2010

(30) Foreign Application Priority Data

Nov. 27, 2008 (CN) .......................... 2008 1 0305793

(51) Int. Cl.
*G06F 12/02* (2006.01)

(52) U.S. Cl. .................. 711/170; 711/103; 711/104

(58) Field of Classification Search .................. None
See application file for complete search history.

(56) References Cited

U.S. PATENT DOCUMENTS

| | | | |
|---|---|---|---|
| 2002/0144073 A1* | 10/2002 | Trainin et al. | 711/170 |
| 2004/0221120 A1* | 11/2004 | Abrashkevich et al. | 711/170 |
| 2006/0095707 A1* | 5/2006 | Hu | 711/171 |
| 2007/0136546 A1* | 6/2007 | Krauss | 711/170 |
| 2008/0082726 A1* | 4/2008 | Elhamias | 711/103 |
| 2008/0183777 A1* | 7/2008 | Xi et al. | 707/205 |
| 2010/0115226 A1* | 5/2010 | Ueno | 711/173 |

\* cited by examiner

*Primary Examiner* — Kaushikkumar Patel
(74) *Attorney, Agent, or Firm* — Altis Law Group, Inc.

(57) ABSTRACT

A memory management system and method for a memory system of a mobile device includes initializing memory blocks of the memory system, obtaining a peak utilization rate and an average fragmentation rate of each memory block, adjusting configuration of each memory block P1 having a maximum peak utilization rate and each memory block P2 having a minimum peak utilization rate if a preset statistical count has been reached. The method further includes adjusting a size of each memory block P3 whose peak utilization rate is greater than a preset peak utilization rate and the average fragmentation rate is a maximum, or adjusting a size of each memory block P4 whose size is less than the size of a memory block P3, and merging residual parts generated by the adjustment to form one or more memory blocks P1.

20 Claims, 11 Drawing Sheets

P5

P6

P7

P8

SYSTEM AND METHOD FOR MANAGING A MEMORY SYSTEM OF A MOBILE DEVICE

BACKGROUND

1. Technical Field

Embodiments of the present disclosure relate to storage system management, and particularly to a system and method for managing a memory system of a mobile device.

2. Description of Related Art

Often, if memory of a mobile phone is full and is not released in time, new received data will fail to be stored promptly or even lost. In one method, a partition memory pool in a real-time operating system (RTOS) is used to manage memory of the mobile phone.

However, the above-mentioned method may result in a large amount of memory fragmentation.

DETAILED DESCRIPTION

All of the processes described below may be embodied in, and fully automated via, functional code modules executed by one or more general purpose mobile devices or processors. The code modules may be stored in any type of readable medium or other storage device. Some or all of the methods may alternatively be embodied in specialized hardware. Depending on the embodiment, the readable medium may be a hard disk drive, a compact disc, a digital video disc, or a tape drive.

Figure 1:
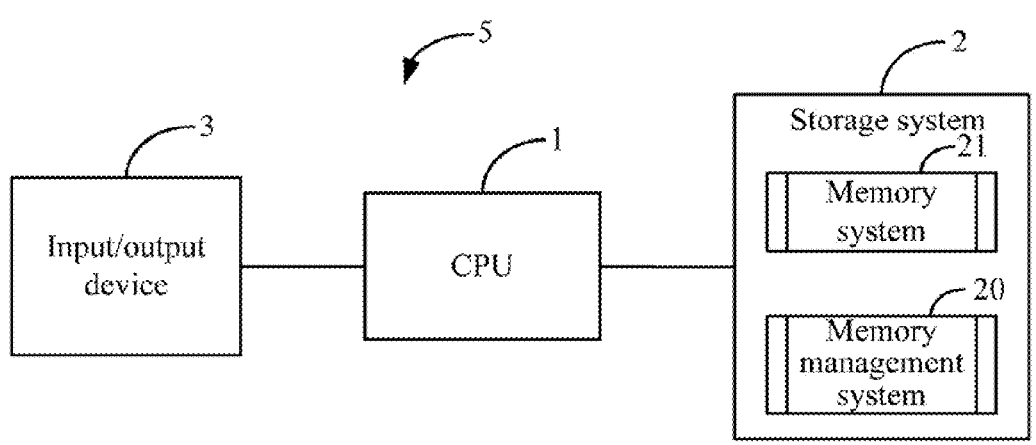
FIG. 1 is a schematic diagram of one embodiment of a mobile device comprising a memory management system.

FIG. 1 is a schematic diagram of one embodiment of a mobile device 5 comprising a memory management system 20. In one embodiment, the mobile device 5 includes a central processing unit (CPU) 1, a storage system 2, and an input/output device 3. The CPU 1 is electronically connected to the storage system 2 and the input/output device 3. In one embodiment, the storage system 2 includes the memory managing system 20 and a memory system 21. The memory system 21 may be a flash memory and the input/output device 3 may include a liquid crystal display (LCD) and a keyboard, but the disclosure is not limited thereto. In one embodiment, the mobile device 5 may be a cell phone, a digital camera, or a personal digital assistant (PDA), for example. The CPU 1 controls execution of computerized codes of the memory management system 20. The memory management system 20 is operable to adjust a configuration of the memory (e.g., non-volatile memory) 21 according to real-time utilization conditions of the memory system 21, so as to reduce the fragmentations (e.g. an internal fragmentation) in the memory system 21.

Figure 2:
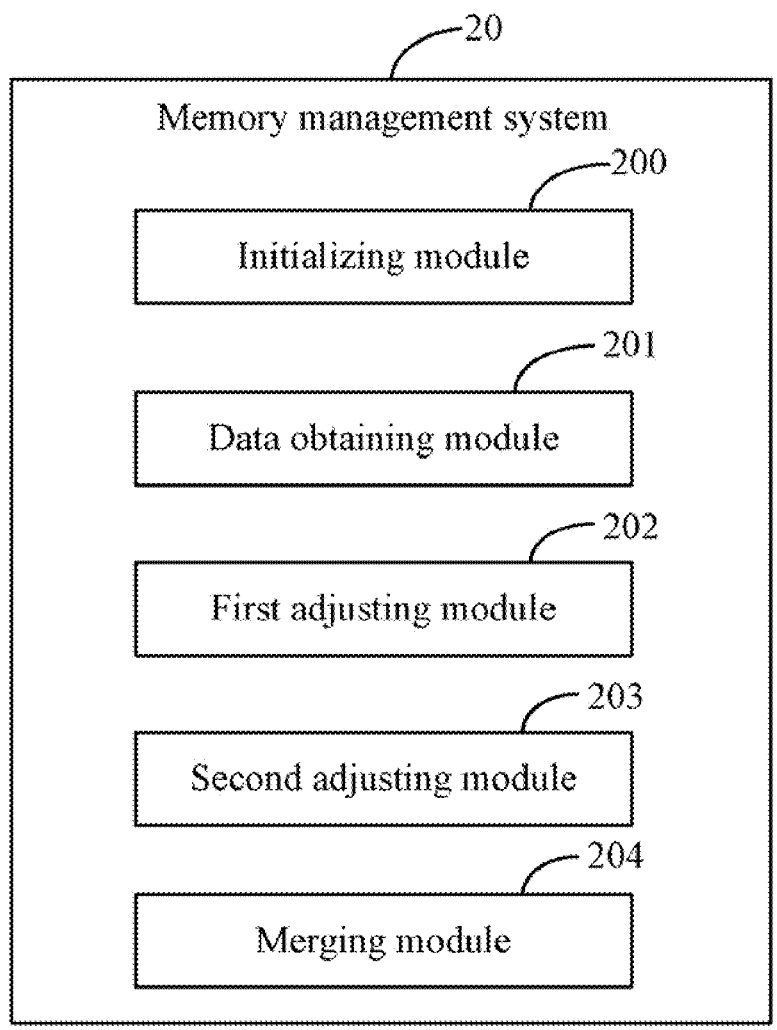
FIG. 2 is a block diagram of one embodiment of the memory management system shown in FIG. 1.

FIG. 2 is a block diagram of one embodiment of the memory management system 20 in FIG. 1. In one embodiment, the memory management system 20 includes an initializing module 200, a data obtaining module 201, a first adjusting module 202, a second adjusting module 203, and an merging module 204.

Figure 4:
FIG. 4 is a schematic diagram of memory blocks of a mobile device.
Figure 4:
Figure 4:
Figure 4:
Figure 4:
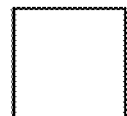
Figure 4:
Figure 4:
Figure 4:
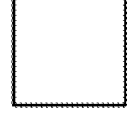
Figure 4:
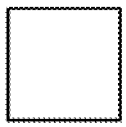
Figure 4:
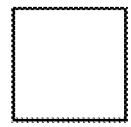

The initializing module 200 initializes the memory system 21 of the mobile device 5 when the mobile device 5 is powered on. In one embodiment, the memory system 21 is divided into a plurality of memory blocks shown in FIG. 4. In one embodiment, "P1, P2, ... Pm" represent each type of memory block under the same conditions respectively (refer to detailed description as followed paragraphs), "N1, N2, ... Nm" represent a total count of each type of the corresponding memory blocks P1, P2, and Pm, "S1, S2, ... Sm" represent a size of each type of the corresponding memory blocks P1, P2, ... and Pm. In one embodiment, memory blocks of the same type have the same size. As shown in FIG. 4, "P5, P6, P7, and P8" represent four types of memory blocks, where the total count of each type of memory blocks P5, P6, P7, and P8 are 18, 12, 4, and 3 respectively, and the size of each memory block P5, P6, P7, and P8 is 1 byte, 2 bytes, 3 bytes, and 4 bytes respectively. Thus, a total size of the memory blocks P5, P6, P7, and P8 are 1*18=18 bytes, 2*12=24 bytes, 3*4=12 bytes, and 4*3 =12 bytes, respectively.

The data obtaining module 201 obtains statistical data of a peak utilization rate and an average fragmentation rate of each memory block after a preset time interval. For example, the preset time interval may be one minute. In one embodiment, the peak utilization rate is the maximum value of the utilization rate of each memory block, the average fragmentation rate is a ratio of unused memory and total memory of the memory block. For example, a size of a memory block may be 50 bytes, and an effective utilization of the memory block may be 35 bytes, so the size of the memory fragmentation in the memory block is 50−35=15 bytes, and the average fragmentation rate of the memory block is 15/50=30%.

The data obtaining module 201 further determines if a preset statistical count (such as 3) of obtaining the statistical data is reached. A detailed description is as follows. Firstly, the data obtaining module 201 records a statistical count T, and determines if the configuration of the memory system 21 is adjusted at a first time. If the memory system 21 is adjusted at the first time, the data obtaining module 201 determines if a value of T is greater than a preset value T1 (i.e. T>T1). Otherwise, if the memory system 21 is not adjusted at the first time, the data obtaining module 201 determines if the value of T is greater than a preset value T2 (i.e., T>T2), where the preset value T1 is greater than or equal to the preset value T2. If T>T1 or T>T2, the data obtaining module 201 determines that the preset statistical count of obtaining the statistical data has been reached, and assigns a value of zero to the variable T. In one embodiment, a variable "isF" is used to determine if the memory system 21 is adjusted at the first time, and the variable "isF" may be a Boolean variable, in one example. In one embodiment, the data obtaining module 201 marks isF=true if the memory system 21 is adjusted at the first time. Otherwise, the data obtaining module 201 marks isF=false if the memory system 21 is not adjusted at the first time.

The first adjusting module 202 adjusts configuration of each memory block of type P1 (hereinafter refer to memory block P1) that has a maximum peak utilization rate and each memory block of type P2 (hereinafter refer to memory block P2) has a minimum peak utilization rate if the preset statistical count reaches (i.e., the value of the statistical count T equals the preset statistical count), and residual parts of the memory blocks P2 constituting a memory block R1. In one embodiment, three peak utilization rates are preset used for adjustment parameters of the configuration of the memory system 21. For example, a first peak utilization rate Ua, a second peak utilization rate Ub, and a third peak utilization rate Uc, where Ua>Ub>Uc. In one embodiment, the memory blocks P1 and P2 will not be adjusted if the peak utilization rates of the memory blocks P1 and P2 are both greater than or equal to the first peak utilization Ua, and the peak utilization rate of a memory block is regarded as Uc if the peak utilization rate of the memory block is less than Uc.

Figure 5A:
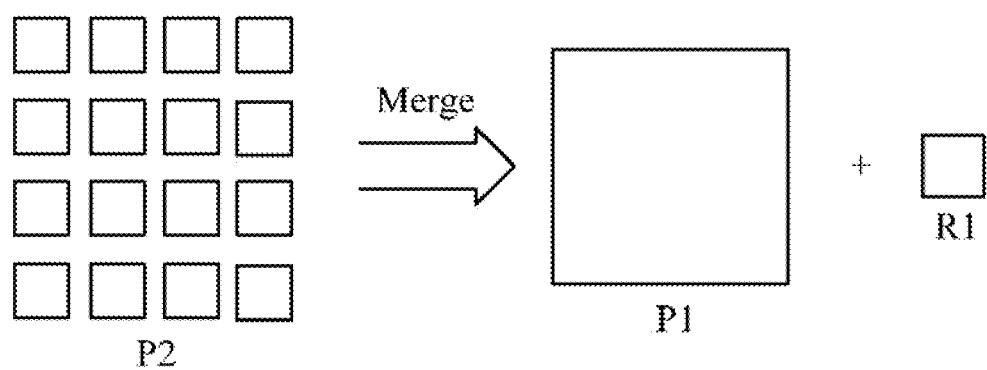
FIG. 5a and FIG. 5b are schematic diagrams of adjusting memory configuration in step S46 in FIG. 3.
Figure 5B:
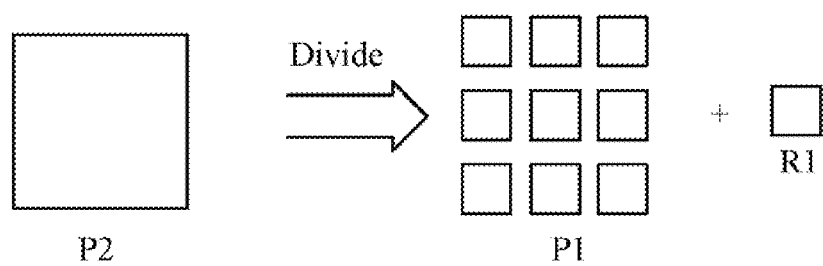

A detailed description of adjusting the configuration of each memory block P1 and each memory block P2 by the first adjusting module 202 is as follows. If a size of a memory block P1 is greater than or equal to a size of a memory block P2, the first adjusting module 202 merges a plurality of memory blocks P2 to form one memory block P1 (refer to FIG. 5a). Otherwise, if the size of a memory block P1 is less than the size of a memory block P2, the first adjusting module 202 divides each memory block P2 into a plurality of memory blocks P1 (refer to FIG. 5b). A further description of adjusting the configuration of each memory block P1 and each memory block P2 will be given in FIG. 6.

The second adjusting module 203 adjusts a size of each memory block of type P3 (hereinafter refer to memory block P3) whose peak utilization rate is greater than a preset peak utilization rate and the average fragmentation rate is a maximum, or adjusts a size of each memory block of type P4 (hereinafter refer to memory block P4) whose size is the largest among memory blocks whose size is less than the size of a memory block P3, according to an effective utilization size of the memory block P3, residual parts of each memory block P3 or P4 constituting a memory block R2. In one embodiment, the memory block P3 or P4 will not be adjusted if the size of the memory block P3 or P4 is the biggest one in all of the memory blocks.

Figure 7A:
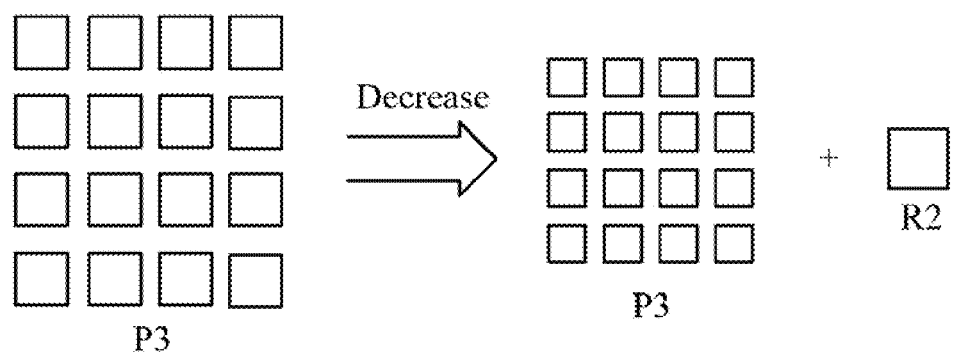
FIG. 7a and FIG. 7b are schematic diagrams of adjusting memory configuration in step S47 in FIG. 3.
Figure 7B:
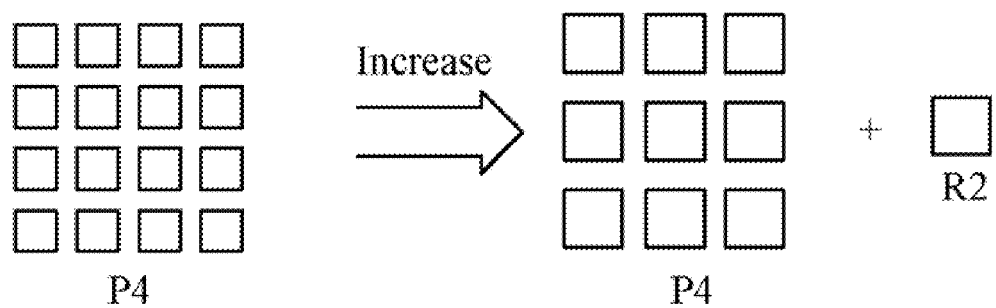

A detailed description of adjusting the size of each memory block P3 or P4 according to an effective utilization size of the memory block P3 by the second adjusting module 203 is as follows. The second adjusting module 203 calculates an equation of O4=((S3*(1−F3%)/S4)−1)*100. In the equation, "S3" represents the size of the memory block P3, "S4" represents the size of the memory block P4, "F3" represents the average fragmentation rate of the memory blocks P3. Then, the second adjusting module 203 decreases the size of each memory block P3 by a preset value D % if F3 is less than O4 (i.e., the effective utilization size of the memory block P3 is close to the size of the memory block P3), and the total count of the memory blocks P3 is invariable (refer to FIG. 7a). Otherwise, the second adjusting module 203 increases the size of the memory blocks P4 by the preset value D % if F3 is greater than or equal to O4 (i.e., the effective utilization size of the memory block P3 is close to the size of the memory block P4), thus the total count of the memory blocks P4 is decreased (refer to FIG. 7b). A further description of adjusting the size of each memory block P3 or P4 will be given in FIG. 8.

Figure 9:
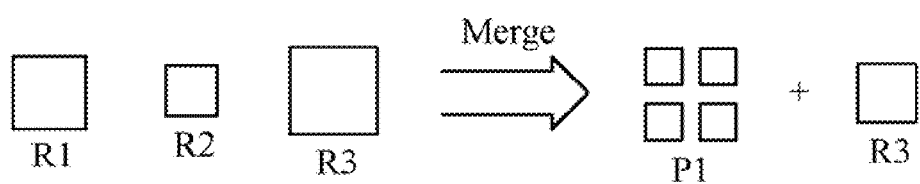
FIG. 9 is a schematic diagram of adjusting memory configuration in step S48 FIG. 3.

The merging module 204 merges the memory blocks R1 and R2 to form one or more memory blocks P1, the residual parts constituting a memory block R3, and R3 is used to merge with R1 and R2 when the memory system 21 is adjusted at a next time of adjusting the configuration of the memory system 21 (refer to FIG. 9).

Figure 3:
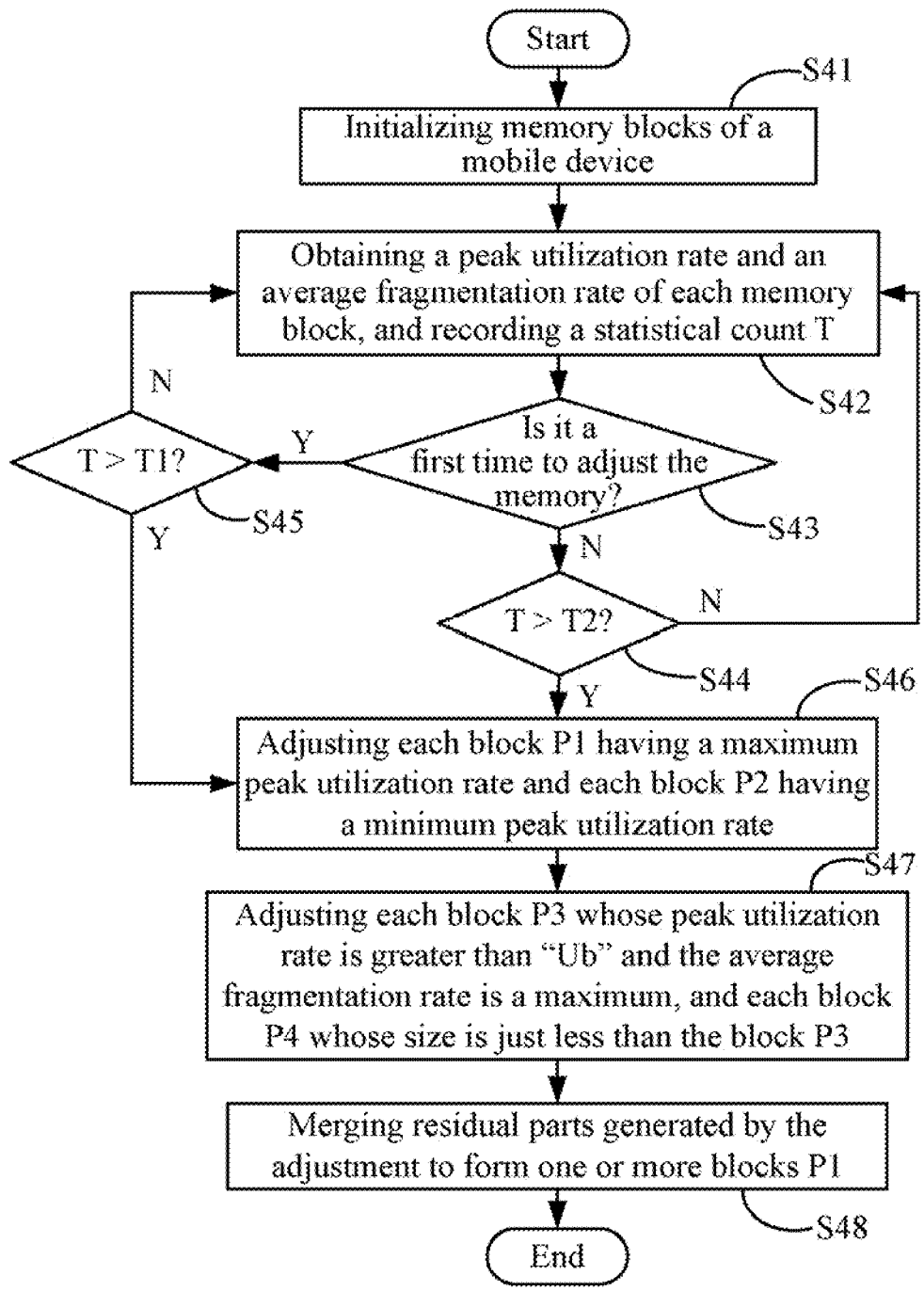
FIG. 3 is a flowchart of one embodiment of a method for managing a memory system of the mobile device.

FIG. 3 is a flowchart of one embodiment of a method for managing the memory system 21 of the mobile device 5.

In block S41, the initializing module 200 initializes the memory system 21 (i.e., memory blocks) of the mobile device 5 when the mobile device 5 is powered on. In one embodiment, the memory system 21 is divided into a plurality of memory blocks shown in FIG. 4. In one embodiment, memory blocks of the same type have the same size.

In block S42, the data obtaining module 201 obtains statistical data of a peak utilization rate and an average fragmentation rate of each memory block after a preset time interval, and records a statistical count T.

In block S43, the data obtaining module 201 determines if the configuration of the memory system 21 is adjusted at a first time. The procedure goes to block S44 if the memory system 21 is not adjusted at the first time. Otherwise, the procedure goes to block S45 if the memory system 21 is adjusted at the first time.

In block S44, the data obtaining module 201 determines if the value of T is greater than a preset value T2 (i.e., T>T2). The procedure goes to block S46 if T>T2. Otherwise, the procedure goes to block S42 if T≦T2.

In block S45, the data obtaining module 201 determines if the value of T is greater than a preset value T1 (i.e., T>T1). The procedure goes to block S46 if T>T1. Otherwise, the procedure goes to block S42 if T≦T1. In one embodiment, the preset value T1 is greater than or equal to the preset value T2 (i.e., T1≧T2), and the data obtaining module 201 determines that a preset statistical count of obtaining the statistical data has been reached if T>T1 or T>T2, and assigns a value of zero to the variable T (i.e., T=0). In other embodiment, the block S43 can be removed if T1=T2.

In block S46, the first adjusting module 202 adjusts configuration of each memory block P1 that has a maximum peak utilization rate and each memory block P2 has a minimum peak utilization rate if the preset statistical count reaches (i.e., the value of the statistical count T equals the preset statistical count), and residual parts of the memory blocks P2 constituting a memory block R1. A detailed description of adjusting the configuration of each memory block P1 and each memory block P2 by the first adjusting module 202 refers to paragraphs are explained above. A further description of adjusting the configuration of each memory block P1 and each memory block P2 will be given in FIG. 6.

In block S47, the second adjusting module 203 adjusts a size of each memory block P3 whose peak utilization rate is greater than a preset peak utilization rate and the average fragmentation rate is a maximum, or adjusts a size of each memory block P4 whose size is the largest among memory blocks whose size is less than the size of a memory block P3, according to an effective utilization size of the memory block P3, residual parts of each memory block P3 or P4 constituting a memory block R2. In one embodiment, the memory block P3 or P4 will not be adjusted if the size of the memory block P3 or P4 is the biggest one in all of the memory blocks. A detailed description of adjusting the size of each memory block P3 or P4 according to an effective utilization size of the memory block P3 by the second adjusting module 203 refers to paragraphs are explained above. A further description of adjusting the size of each memory block P3 or P4 will be given in FIG. 8.

In block S48, the merging module 204 merges the memory blocks R1 and R2 to form one or more memory blocks P1, the residual parts constituting a memory block R3, and R3 is used to merge with R1 and R2 when the memory system 21 is adjusted at a next time (refer to FIG. 9).

Figure 6:
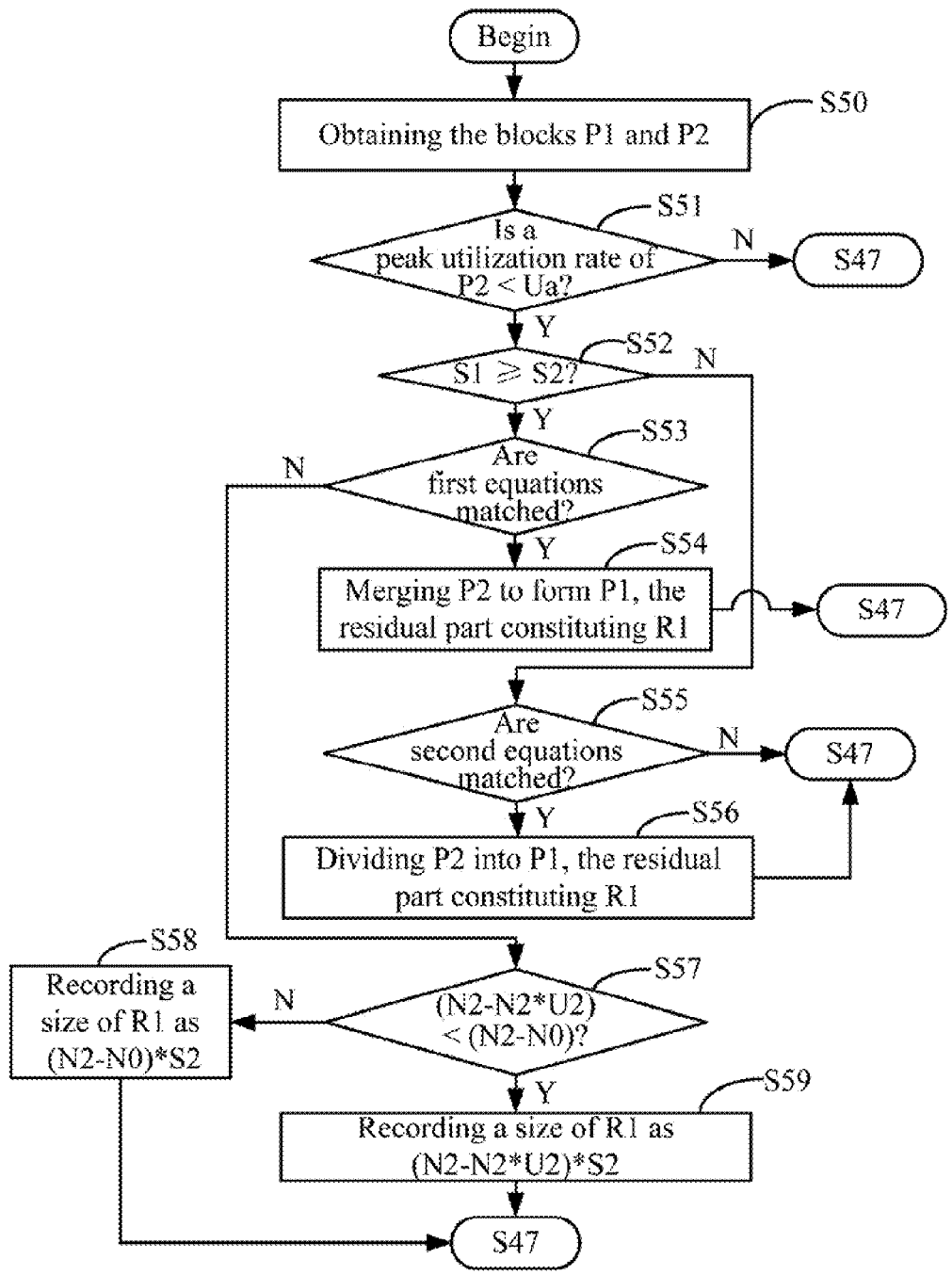
FIG. 6 is a detailed description of step S46 in FIG. 3.

FIG. 6 is a detailed description of step S46 in FIG. 4. In block S50, the first adjusting module 202 obtains each memory block P1 having the maximum peak utilization rate and each memory block P2 having the minimum peak utilization rate.

In block S51, the first adjusting module 202 determining if a peak utilization rate of the memory block P2 is less than the first peak utilization rate Ua. The procedure goes to block S52 if the peak utilization rate of P2 is less than Ua. Otherwise, the procedure goes to block S47 if the peak utilization rate of P2 is greater than or equal to Ua.

In block S52, the first adjusting module 202 determining if a size of the memory block P1 greater than or equal to a size of the memory block P2 (i.e., S1≧S2). The procedure goes to block S53 if S1≧S2. Otherwise, the procedure goes to block S55 if S1<S2.

In block S53, the first adjusting module 202 determining if first equations are matched. The procedure goes to block S54 if the first equations are matched. Otherwise, the procedure goes to block S57 if the first equations are not matched. In one embodiment, the first equations are: N2−(S1≧S2)>N2*U2, and N2−(S1≧S2)>N0. In the first equations, "N2" represents a total count of the memory blocks P2 before adjusting, "U2" represents a statistical data of a peak utilization rate of each memory block P2, "N0" represents a preset value of a minimum count of the memory block P2 acceptably.

In block S54, the adjusting module 202 merges a plurality of memory blocks P2 into one memory block P1, the residual part of the memory blocks P2 constituting a memory block R1, then, the procedure goes to block S47.

In block S55, the first adjusting module 202 determining if second equations are matched. The procedure goes to block S56 if the second equations are matched. Otherwise, the procedure goes to block S47 if the second equations are not matched. In one embodiment, the second equations are: N2−1>N2*U2, and N2−1>N0.

In block S56, the first adjusting module 202 divides each memory block P2 into a plurality of memory blocks P1, the residual part of the memory blocks P2 constituting a memory block R1, then, the procedure goes to block S47.

In block S57, the first adjusting module 202 determining if (N2−N2*U2)<(N2−N0). The procedure goes to block S59 if (N2−N2*U2)≦(N2−N0). Otherwise, the procedure goes to block S58 if (N2−N2*U2)≧(N2−N0).

In block S58, the first adjusting module 202 records a size of R1 as (N2−N0)*S2, then, the procedure goes to block S47.

In block S59, the first adjusting module 202 records a size of R1 as (N2−N2*U2)*S2, then, the procedure goes to block S47.

Figure 8:
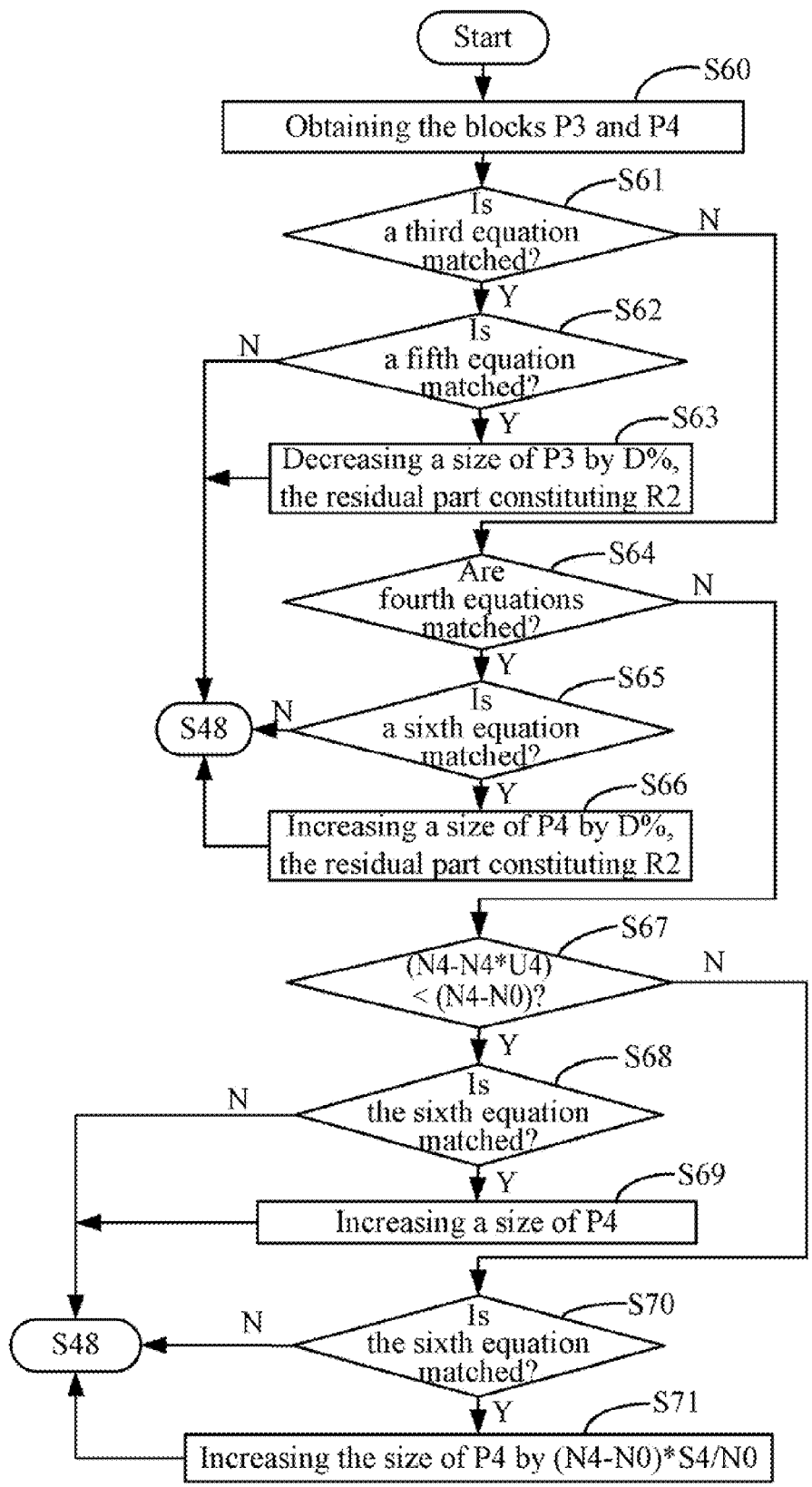
FIG. 8 is a detailed description of step S47 in FIG. 3.

FIG. 8 is a detailed description of step S47 in FIG. 4. In block S60, the second adjusting module 203 obtains each memory block P3 whose peak utilization rate is greater than a preset peak utilization rate and the average fragmentation rate is the maximum one, and obtains each memory block P4 whose size is the largest among memory blocks whose size is less than the size of a memory block P3.

In block S61, the second adjusting module 203 determining if a third equation is matched. The procedure goes to block S62 if the third equation is matched. Otherwise, the procedure goes to block S64 if the third equation is not matched. In one embodiment, the third equation is: F3<((S3*(1−F3%)/S4)−1)*100. In the third equation, "F3" represents an average fragmentation rate of the memory block P3.

In block S62, the second adjusting module 203 determining if a fifth equation is matched. The procedure goes to block S63 if the fifth equation is matched. Otherwise, the procedure goes to block S48 if the fifth equation is not matched. In one embodiment, the fifth equation is: S3*(1−D %)>S4. In the third equation, "D %" is a preset value, for example, 10%.

In block S63, the second adjusting module 203 decreases the size of each memory block P3 by the preset value D %, and the total count of the memory blocks P3 is invariable, the residual part of each memory block P3 constituting a memory block R2, then the procedure goes to block S48.

In block S64, the second adjusting module 203 determining if fourth equations are matched. The procedure goes to block S65 if the fourth equations are matched. Otherwise, the procedure goes to block S67 if the fourth equations are not matched. In one embodiment, the fourth equations are: (N4*S4)/(S4*(1+D %))>N4*U4, and (N4*S4)/(S4*(1+D %))>N0. In the fourth equations, "N4" represents a total count of the memory blocks P4 before adjusting, "U4" represents a statistical data of a peak utilization rate of the memory block P4.

In block S65, the second adjusting module 203 determining if a sixth equation is matched. The procedure goes to block S66 if the sixth equation is matched. Otherwise, the procedure goes to block S48 if the sixth equation is not matched. In one embodiment, the sixth equation is: S4<S3. In the sixth equation, "S4" represents a size of the memory block P4 after adjusting.

In block S66, the second adjusting module 203 increases the size of the memory blocks P4 by the preset value D %, where the total count of the memory blocks P4 is decreased, the residual part of each memory block P4 constituting a memory block R2, then the procedure goes to block S48.

In block S67, the second adjusting module 203 determining if (N4−N4*U4)<(N4−N0). The procedure goes to block S68 if (N4−N4*U4)<(N4−N0). Otherwise, the procedure goes to block S70 if (N4−N4*U4)≧(N4−N0).

In block S68, the second adjusting module 203 determining if the sixth equation is matched. The procedure goes to block S69 if the sixth equation is matched. Otherwise, the procedure goes to block S48 if the sixth equation is not matched.

In block S69, the second adjusting module 203 increases the size of the memory blocks P4 by a value of (N4−N4*U4)*S4/(N4*U4), where the total count of the memory blocks P4 after adjusting is N4*U4, the residual part of each memory block P4 constituting the memory block R2, then the procedure goes to block S48. "N4" represents the total count of the memory blocks P4 before adjusting, "U4" represents the statistical data of the peak utilization rate of the memory block P4.

In block S70, the second adjusting module 203 determining if the sixth equation is matched. The procedure goes to block S71 if the sixth equation is matched. Otherwise, the procedure goes to block S48 if the sixth equation is not matched. In block S71, the second adjusting module 203 increases the size of the memory blocks P4 by a value of (N4−N0)*S4/N0, where the total count of the memory blocks P4 after adjusting is N0, the residual part of each memory block P4 constituting the memory block R2, then the procedure goes to block S48.

The present embodiment automatically adjusts a configuration of the memory system 21 according to a real-time utilization conditions of the memory system 21, so as to reduce the fragmentations in the memory system 21 of the mobile device 5.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A memory management method for a memory system of a mobile device, the method comprising:
   initializing memory blocks of the memory system when the mobile device is powered on, and obtaining statistical data of a peak utilization rate and an average fragmentation rate of each memory block after a preset time interval;
   adjusting memory configuration of the memory blocks if a preset statistical count of obtaining the statistical data has been reached, the adjusting comprising:
   adjusting configuration of each memory block of type P1 having a maximum peak utilization rate and each memory block of type P2 having a minimum peak utilization rate, residual parts of said each memory block of type P2 constituting a memory block R1;
   adjusting a size of each memory block of type P3 whose peak utilization rate is greater than a preset peak utilization rate and the average fragmentation rate is a maximum, or adjusting a size of each memory block of type P4 whose size is largest among the memory blocks whose size is less than a size of a memory block of type P3, according to an effective utilization size of said each memory block of the type P3, residual parts of said each memory block of the type P3 or P4 constituting a memory block R2; and
   merging the memory blocks R1 and R2 to form one or more memory blocks of the type Pl, the residual parts constituting a memory block R3, wherein the memory block R3 is used to merge with the memory blocks R1 and R2 when the memory system is adjusted at a next time.

2. The method according to claim 1, conditions of determining if a preset statistical count of obtaining the statistical data is reached comprise:
   recording a statistical count T, and determining if the configuration of the memory blocks is adjusted at a first time;
   determining if a value of T is greater than a preset value T1 if the configuration of the memory blocks is adjusted at the first time;
   determining if the value of T is greater than a preset value T2 if the configuration of the memory blocks is not adjusted at the first time, wherein the preset value T1 is greater than or equal to the preset value T2; and
   determining that the preset statistical count of obtaining the statistical data has been reached if the value of T is greater than the preset value T1 or the value of T is greater than the preset value T2, and assigning a value of zero to the variable T.

3. The method according to claim 1, wherein adjusting configuration of each memory block of type P1 and each memory block of type P2 comprises:
   merging a plurality of memory blocks of the type P2 to form one memory block of the type P1 if a size of the memory block of the type P1 is greater than or equal to a size of the memory block of the type P2, wherein each type of the memory blocks P1 or P2 having same size; and
   dividing said each memory block of the type P2 into a plurality of memory blocks of the type P1 if the size of the memory block of the type P1 is less than the size of the memory block of the type P2.

4. The method according to claim 1, wherein adjusting the size of each memory block of type P3 or each memory block of type P4 according to the effective utilization size of said each memory block of the type P3 comprises:
   decreasing a size of said each memory block of the type P3 if the effective utilization size of the memory block of the type P3 is close to the size of the memory block of the type P3, wherein said each memory block of the type P3 having same size; and
   increasing a size of the memory blocks of the type P4 if the effective utilization size of the memory block of the type P3 is close to the size of the memory block of the type P4, wherein said each memory block of the type P4 having same size.

5. The method according to claim 4, wherein adjusting the size of each memory block of type P3 or each memory block of type P4 according to the effective utilization size of said each memory block of the type P3 comprises:
   calculating an equation of $O4=((S3*(1-F3\%)/S4)-1)*100$, wherein "S3" represents the size of the memory block of the type P3, "S4" represents the size of the memory block of the type P4, and "F3" represents the average fragmentation rate of the memory block of the type P3;
   decreasing the size of said each memory block of the type P3 by a preset value D% if F3 is less than O4, wherein a total count of the memory blocks of the type P3 is invariable; and
   increasing the size of the memory blocks of the type P4 by the preset value D% if F3 is greater than or equal to O4, so that a total count of the memory blocks of the type P4 is decreased.

6. The method according to claim 5, wherein the memory block of the type P3 or P4 is not adjusted if the size of the memory block of the type P3 or P4 is biggest one in all of the memory blocks.

7. The method according to claim 1, wherein the mobile device is selected from a group consisting of a cell phone, a digital camera, and a personal digital assistant (PDA).

8. A storage medium having stored thereon instructions that, when executed by a processor of a mobile device, causes the processor to perform a method for managing a memory system of the mobile device, the method comprising:
   initializing memory blocks of the memory system when the mobile device is powered on, and obtaining statistical data of a peak utilization rate and an average fragmentation rate of each memory block after a preset time interval;
   adjusting memory configuration of the memory blocks if a preset statistical count of obtaining the statistical data has been reached, the adjusting comprising:
   adjusting configuration of each memory block of type P1 having a maximum peak utilization rate and each memory block of type P2 having a minimum peak utilization rate, residual parts of said each memory block of type P2 constituting a memory block R1;
   adjusting a size of each memory block of type P3 whose peak utilization rate is greater than a preset peak utilization rate and the average fragmentation rate is a maximum, or adjusting a size of each memory block of type P4 whose size is largest among the memory blocks whose size is less than a size of a memory block of type P3, according to an effective utilization size of said each memory block of the type P3, residual parts of said each memory block of the type P3 or P4 constituting a memory block R2; and merging the memory blocks R1 and R2 to form one or more memory blocks of the type Pl, the residual parts constituting a memory block R3, wherein the memory block R3 is used to merge with the memory blocks R1 and R2 when the memory system is adjusted at a next time.

9. The storage medium according to claim 8, conditions of determining if a preset statistical count of obtaining the statistical data is reached comprise:

recording a statistical count T, and determining if the configuration of the memory blocks is adjusted at a first time;

determining if a value of T is greater than a preset value T1 if the configuration of the memory blocks is adjusted at the first time;

determining if the value of T is greater than a preset value T2 if the configuration of the memory blocks is not adjusted at the first time, wherein the preset value T1 is greater than or equal to the preset value T2; and determining that the preset statistical count of obtaining the statistical data has been reached if the value of T is greater than the preset value T1 or the value of T is greater than the preset value T2, and assigning a value of zero to the variable T.

10. The storage medium according to claim 8, wherein adjusting the configuration of each memory block of type P1 and each memory block of type P2 comprises:

merging a plurality of memory blocks of the type P2 to form one memory block of the type P1 if a size of the memory block of the type P1 is greater than or equal to a size of the memory block of the type P2, wherein each type of the memory blocks of type P1 or P2 having same size; and dividing said each memory block of the type P2 into a plurality of memory blocks of the type P1 if the size of the memory block of the type P1 is less than the size of the memory block of the type P2.

11. The storage medium according to claim 8, wherein the step of adjusting the size of each memory block of type P3 or each memory block of type P4 according to the effective utilization size of said each memory block of the type P3 comprises:

decreasing a size of said each memory block of the type P3 if the effective utilization size of the memory block of the type P3 is close to the size of the memory block of the type P3, wherein said each memory block of the type P3 having same size; and increasing a size of the memory blocks of the type P4 if the effective utilization size of the memory block of the type P3 is close to the size of the memory block of the type P4, wherein said each memory block of the type P4 having same size.

12. The storage medium according to claim 11, wherein adjusting the size of each memory block of type P3 or each memory block of type P4 according to the effective utilization size of said each memory block of the type P3 comprises:

calculating an equation of $O4=((S3*(1-F3\%)/S4)-1)*100$, wherein "S3" represents the size of the memory block of the type P3, "S4" represents the size of the memory block of the type P4, and "F3" represents the average fragmentation rate of the memory block of the type P3;

decreasing the size of said each memory block of the type P3 by a preset value D% if F3 is less than O4, wherein a total count of the memory blocks of the type P3 is invariable; and increasing the size of the memory blocks of the type P4 by the preset value D% if F3 is greater than or equal to O4, so that a total count of the memory blocks of the type P4 is decreased.

13. The storage medium according to claim 12, wherein the memory block of the type P3 or P4 is not adjusted if the size of the memory block of the type P3 or P4 is biggest one in all of the memory blocks.

14. The storage medium according to claim 8, wherein the mobile device is selected from a group consisting of a cell phone, a digital camera, and a personal digital assistant (PDA).

15. A mobile device, comprising:

at least one processor;

a storage system; and one or more programs stored in the storage system and executed by the at least one processor, the one or more programs comprising:

an initializing module operable to initialize memory blocks of the memory system when the mobile device is powered on;

a data obtaining module operable to obtain statistical data of a peak utilization rate and an average fragmentation rate of each memory block after a preset time interval;

the data obtaining module further operable to determine if a preset statistical count of obtaining the statistical data has been reached;

a first adjusting module operable to adjust configuration of each memory block of type P1 having a maximum peak utilization rate and each memory block of type P2 having a minimum peak utilization rate if the preset statistical count reaches, residual parts of said each memory block of type P2 constituting a memory block R1;

a second adjusting module operable to adjust a size of each memory block of type P3 whose peak utilization rate is greater than a preset peak utilization rate and the average fragmentation rate is a maximum, or adjust a size of each memory block of type P4 whose size is largest among the memory blocks whose size is less than a size of a memory block of type P3, according to an effective utilization size of said each memory block of the type P3, residual parts of said each memory block of the type P3 or P4 constituting a memory block R2; and a merging module operable to merge the memory blocks R1 and R2 to form one or more memory blocks of the type P1, the residual parts constituting a memory block R3, wherein the memory block R3 is used to merge with the memory blocks R1 and R2 when the memory system is adjusted at a next time.

16. The mobile device according to claim 15, the data obtaining module determines if a preset statistical count of obtaining the statistical data is reached comprises:

recording a statistical count T, and determining if the configuration of the memory blocks is adjusted at a first time;

determining if a value of T is greater than a preset value T1 if the configuration of the memory blocks is adjusted at the first time;

determining if the value of T is greater than a preset value T2 if the configuration of the memory blocks is not adjusted at the first time, wherein the preset value T1 is greater than or equal to the preset value T2; and determining that the preset statistical count of obtaining the statistical data has been reached if the value of T is greater than the preset value T1 or the value of T is greater than the preset value T2, and assigning a value of zero to the variable T.

17. The mobile device according to claim 15, wherein the first adjusting module adjusts the configuration of each memory block of type P1 and each memory block of type P2 comprises:
   merging a plurality of memory blocks of the type P2 to form one memory block of the type P1 if a size of the memory block of the type P1 is greater than or equal to a size of the memory block of the type P2, wherein each type of the memory blocks of type P1 or P2 having same size; and
   dividing said each memory block of the type P2 into a plurality of memory blocks of the type P1 if the size of the memory block of the type P1 is less than the size of the memory block of the type P2.

18. The mobile device according to claim 15, wherein the second adjusting module adjust the size of each memory block of type P3 or each memory block of type P4 according to the effective utilization size of said each memory block of the type P3 comprises:
   decreasing a size of said each memory block of the type P3 if the effective utilization size of the memory block of the type P3 is close to the size of the memory block of the type P3, wherein said each memory block of the type P3 having same size; and
   increasing a size of the memory blocks of the type P4 if the effective utilization size of the memory block of the type P3 is close to the size of the memory block of the type P4, wherein said each memory block of the type P4 having same size.

19. The mobile device according to claim 18, wherein the second adjusting module adjust the size of each memory block of type P3 or each memory block of type P4 according to the effective utilization size of said each memory block of the type P3 comprises:
   calculating an equation of $O4=((S3*(1-F3\%)/S4)-1)*100$, wherein "S3" represents the size of the memory block of the type P3, "S4" represents the size of the memory block of the type P4, and "F3" represents the average fragmentation rate of the memory block of the type P3;
   decreasing the size of said each memory block of the type P3 by a preset value D% if F3 is less than O4, wherein a total count of the memory blocks of the type P3 is invariable; and
   increasing the size of the memory blocks of the type P4 by the preset value D% if F3 is greater than or equal to O4, so that a total count of the memory blocks of the type P4 is decreased.

20. The mobile device according to claim 19, wherein the memory block of the type P3 or P4 is not adjusted if the size of the memory block of the type P3 or P4 is biggest one in all of the memory blocks.

* * * * *